United States Patent [19]

Lintzenich

[11] 3,891,667

[45] June 24, 1975

[54] PHOSPHORAMIDATE DERIVATIVES

[75] Inventor: Vincent C. Lintzenich, Collinsville, Ill.

[73] Assignee: Shell Oil Company, Houston, Tex.

[22] Filed: Aug. 15, 1974

[21] Appl. No.: 497,778

Related U.S. Application Data

[60] Division of Ser. No. 251,624, May 9, 1972, Pat. No. 3,846,317, and a continuation-in-part of Ser. No. 115,868, Feb. 16, 1971, abandoned, and a continuation-in-part of Ser. No. 803,078, Feb. 27, 1969, abandoned, and a continuation-in-part of Ser. No. 200,217, Nov. 18, 1971, abandoned, which is a continuation-in-part of Ser. No. 66,606, Aug. 24, 1970, abandoned.

[52] U.S. Cl. .............................. 260/308 R; 260/937
[51] Int. Cl. ........................................ C07d 105/04
[58] Field of Search .............................. 260/308 R

[56] References Cited

UNITED STATES PATENTS 3,270,093  8/1966  Gradsten ............................ 260/937

FOREIGN PATENTS OR APPLICATIONS 1,252,904  12/1960  France ................................ 260/308
2,206,933  8/1972  Germany ............................ 260/308

Primary Examiner—Alton D. Rollins
Attorney, Agent, or Firm—Leonard P. Miller; Henry C. Geller

[57] ABSTRACT

Phosphoramidates of triazoles, such as 1,2,4 triazoles, effective as load-carrying agents, corrosion inhibitors, antioxidants increase the stability of lubricant compositions.

6 Claims, No Drawings

PHOSPHORAMIDATE DERIVATIVES

CROSS REFERENCE TO RELATED APPLICATIONS

This is a division of application Ser. No. 251,624, filed May 9, 1972 now U.S. Pat. No. 3,846,317. Said Ser. No. 251,624 is a continuation-in-part of applicant's copending application Ser. No. 115,868, filed Feb. 16, 1971, now abandoned said copending application being a continuation-in-part of applicant's application Ser. No. 803,078, filed Feb. 27, 1969, now abandoned; and a continuation-in-part of applicant's copending application Ser. No. 200,217, filed Nov. 18, 1971, now abandoned which is a continuation-in-part of applicant's application Ser. No. 66,606, filed Aug. 24, 1970, now abandoned, the latter application being a division of said Ser. No. 803,078.

BACKGROUND OF THE INVENTION

Lubricating oils which are employed in high speed engines, particularly in gas-turbine engines, must be able to withstand extreme temperature and pressure variations, must be oxidation resistant, and must also be effective in controlling corrosion which would otherwise be excessive because of the severe operating conditions. Only a select few lubricants are known to the art which possess the properties requisite for use in this application, and since each successive generation of gas-turbine engines is designed to operate at higher temperatures to optimize performance, the number of qualified lubricants is diminishing. Therefore, to keep pace with increasingly more stringent specification requirements, there is a continuing need in the industry for the development of additives which will impart necessary properties to lubricating oils used in high speed engines. This invention relates to such additives and to lubricating compositions containing them.

SUMMARY OF THE INVENTION

It has now been found that a novel class of phosphorus containing triazole derivatives, i.e., phosphorinane-amino-triazole derivatives, impart not only good load-carrying characteristics to lubricant compositions, but also are effective in inhibiting corrosion and improving the antioxidant properties and stability of the oil. This class of novel compounds can be represented by the general formula

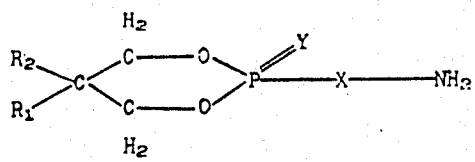

wherein $R_1$ and $R_2$ are H or alkyl, X is a heterocyclic group containing two or more nitrogen atoms in which the phosphorus atom is attached to a ring nitrogen adjacent to another ring nitrogen, and Y is selected from the group consisting of oxygen and sulfur.

The invention therefore relates to a novel class of additives and to lubricant compositions containing such compounds. More particularly, it relates to phosphorinane-amino-triazole derivatives which are effective in improving the load-carrying capacity and the anticorrosion, antioxidant, and stability characteristics of mineral and synthetic lubricating oils. These preferred derivatives may be represented by the following formula

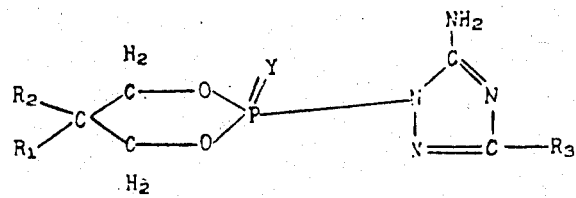

wherein $R_1$ and $R_2$ are each selected from the group consisting of hydrogen and $C_{1-20}$ alkyl groups, $R_3$ is selected from the group consisting of hydrogen, alkyl, aryl and alkaryl, said hydrocarbyl groups having from 1 to 12 carbon atoms, and Y is selected from the group consisting of oxygen and sulfur. A more preferred class of compounds are those in which $R_1$ and $R_2$ are alike or different $C_{1-8}$ alkyl groups. Especially preferred are compounds wherein $R_3$ is hydrogen and $R_1$ and $R_2$ are alike or different $C_{1-4}$ alkyl groups. However, the compounds in which $R_1$ and $R_2$ are methyl and $R_3$ is hydrogen have been found to be especially advantageous in the composition of this invention.

DESCRIPTION OF THE PREFERRED EMBODIMENTS

Generally any heterocyclic compound such as substituted or unsubstituted imidazoles, pyrazoles, triazoles and the like which contain an amino group substituted on the heterocyclic ring can be reacted with a 1,3-dioxa-2-oxo-2-chlorophosphorinane to form the compounds of the invention. Amino triazoles are a preferred class of reactants of this type, especially triazoles having nitrogen atoms in the 1,2,4 positions. Thus a highly suitable class of compounds are those in which X is a 1,2,4-triazole and $R_1$ and $R_2$ are alkyl groups.

The novel compounds of the invention may be conveniently prepared by reacting equimolar quantities of an alkyl substituted 1,3-dioxa-2-oxo-2-chlorophosphorinane or an alkyl substituted 1,3-dioxa-2-thiono-2-chlorophosphorinane with a substituted or unsubstituted 3-amino-1,2,4-triazole. Preferred substituted triazoles are those substituted in the 5 position. Examples of such triazoles are 3-amino-1,2,4-triazole, 3-amino-5-pentyl-1,2,4-triazole, 3-amino-5-heptyl-1,2,4-triazole, 3-amino-5-(4-isopropylphenyl)-1,2,4-triazole, 3-amino-5-pyridyl-1,2,4-triazole, 3-amino-5-anilido-1,2,4-triazole, 3-amino-5-methyl-1,2,4-triazole, 3-amino-5-(p-tert-butylphenyl)-1,2,4-triazole, 3-amino-5-phenyl-1,2,4-triazole and the like.

Suitable oxo- or thiono-phosphorinanes may be prepared by reacting a 1,3-alkanediol with phosphorus oxychloride or thiophosphoryl chloride in the presence of a hydrogen halide sequestering agent. Examples of suitable 1,3-alkanediols include 1,3-propanediol, 2,2-dimethyl-1,3-propanediol, 2,2-diethyl-1,3-propanediol, 2-butyl-2-ethyl-1,3-propanediol, 2-butyl-2-methyl-1,3-propanediol, 2,2-dioctyl-1,3-propanediol, 2-methyl-2-octadecyl-1,3-propanediol, 2-octadecyl-1,3-propanediol and the like. Suitable sequestering agents include various pyridines and tertiary amines such as triethylamine.

Further details concerning the method of preparation of these compounds are given in the examples.

The novel additives of this invention may be dissolved or dispersed in either mineral or synthetic lubricating oils in minor amounts of from 0.01 percent to about 3 percent, preferably from 0.1 to about 1 percent by composition weight. These compounds have been found to be extremely useful in synthetic oils which are often used under severe conditions where the advantages of these additives become more pronounced.

Synthetic lubricants suitable for the invention are of various types, such as aliphatic esters, silicones, polyalkylene oxides, polyphenyl ethers, fluorinated hydrocarbons, polyolefins, and phosphate esters.

Examples of silicones include methyl silicone, methylphenyl silicone, methylchlorophenyl silicone, etc. Examples of polyalkylene oxides are polyisopropylene oxide, polyisopropylene oxide diether, and polyisopropylene oxide diester. Fluorinated hydrocarbons include fluorinated oils and perfluorinated hydrocarbons. Preferred synthetic lubricant base stocks are esters of alcohols having 1 to 20, especially 4 to 12, carbon atoms and aliphatic carboxylic acids having from 3 to 20, especially 4 to 12, carbon atoms.

Particularly suitable ester oils are diisooctyl adipate, diisodecyl adipate and mixtures thereof. Other preferred esters for use as base stocks in the present invention are esters of monocarboxylic acids having 3 to 12 carbons and polyalcohols, such as pentaerythritol, dipentaerythritol, and trimethylolpropane. Pentaerythrityl and dipentaerythrityl esters of mixtures of $C_{4-12}$ acids are particularly suitable base oils for the compositions of the invention. Preparation of these esters is described in Eichemeyer, U.S. Pat. No. 3,038,859, issued June 12, 1962, and Young, U.S. Pat. No. 3,121,109, issued Feb. 11, 1964.

In addition to the aforementioned synthetic oils, the additives of this invention may also be incorporated in mineral lubricating oils. The mineral lubricating oil can be obtained from paraffinic, naphthenic, asphaltic or mixed base crudes and/or mixtures thereof, for example, neutral oils having viscosities of from 100 to 6500 SSU at 100°F.

Other additives can be incorporated into the lubricating compositions according to the present invention. For example, any of the additives recognized in the art to perform a particular function or functions, i.e., viscosity index improvers such as methacrylic polymers, antioxidants, such as amines, phosphorus or phenolic compounds, i.e., phenyl-alpha-naphthylamine, dioctyldiphenyl amine; zinc dialkyl dithiophosphate, or 4,4'-methylene-bis(2,6-di-t-butylphenol); anti-foam agents, corrosion inhibitors; anti-rust agents and the like can be used.

The following examples are illustrative of the novel compositions of the invention and their manner of preparation and use.

EXAMPLE I

Compound A

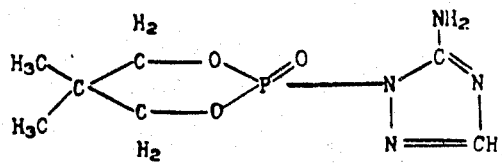

2-(5-amino-1,2,4-triazol-1-yl)-5,5-dimethyl-2-oxo-1,3,2-dioxaphosphorinane

The above-identified compound was prepared by reacting equimolar quantities of 3-amino-1,2,4-triazole and 1,3-dioxa-5,5-dimethyl-2-oxo-2-chloro-phosphorinane in toluene by refluxing the mixture at 100° to 110°C at atmospheric pressure in the presence of a tertiary amine sequestering agent.

The chloro-phosphorinane reactant was prepared by slowly adding 306 g (2.0 moles) of phosphorus oxychloride to 104 g (1.0 moles) of 2,2-dimethyl-1,3-propanediol in 250 ml of benzene with stirring. The stirring was continued for two hours after which the solvent was removed by letting the reaction mixture stand overnight in vacuo.

The foregoing reactions are represented by the following equations:

(1)
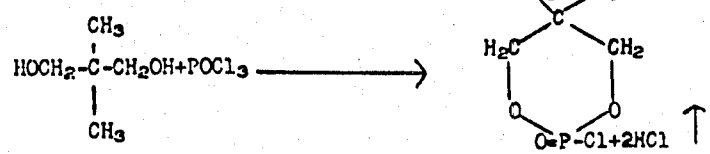

(2)
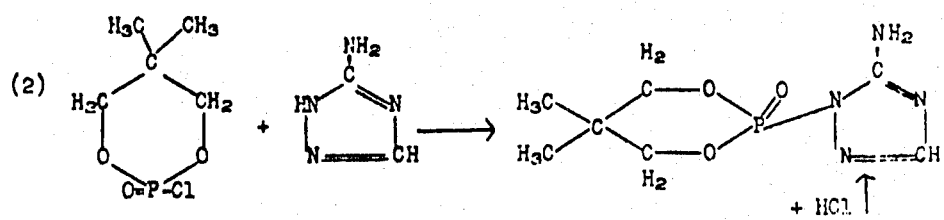

Compound B

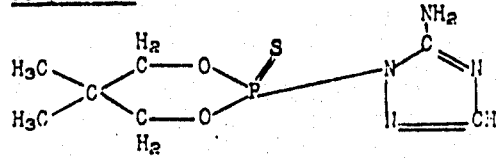

2-(5-amino-1,2,4-triazol-1-yl)-5,5-dimethyl-2-thiono-1,3,2-dioxaphosphorinane

This compound was synthesized according to the procedure outlined for preparing Compound A, except that thiophosphoryl chloride was used in place of phosphorus oxychloride to prepare the chloro-phosphorinane reactant.

Anal. Calcd. for $C_7H_{13}PN_4O_2S$: P, 12.5; N, 22.6; S, 12.9. Found: P, 12.8; N, 22.4; S, 12.6; m.p. 175°–177°C.

Compound C

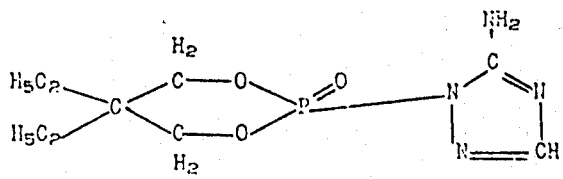

2-(5-amino-1,2,4-triazol-1-yl)-5,5-diethyl-2-oxo-1,3,2-dioxaphosphorinane

This compound was prepared according to the procedure outlined for preparing Compound A, except that 2,2-diethyl-1,3-propanediol was used in place of 2,2-dimethyl-1-3-propanediol.

Compound D

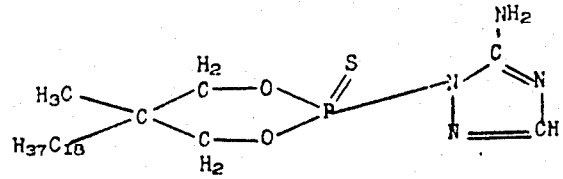

2-(5-amino-1,2,4-triazol-1-yl)-5-methyl-5-octadecyl-2-thiono-1,3,2-dioxaphosphorinane This compound was prepared according to the procedure outlined for preparing Compound A, except that 2-methyl-2-octadecyl-1,3-propanediol was used in place of 2,2-dimethyl-1,3-propanediol and thiophosphoryl chloride in the presence of triethylamine sequestering agent was used in place of phosphorus oxychloride to prepare th chloro-phosphorinane reactant.

Compound E

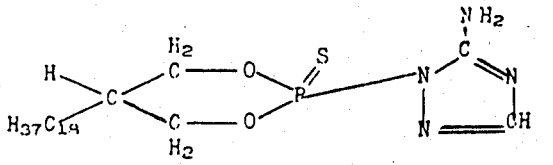

2-(5-amino-1,2,4-triazol-1-yl)-5-octadecyl-2-thiono-1,3,2-dioxaphosphorinane

This compound was prepared according to the procedure outlined for preparing Compound D, except that 2-octadecyl-1,3-propanediol was used in place of 2-methyl-2-octadecyl-1,3-propanediol.

Further illustrative compounds which can be prepared employing the methods outlined, and which are suitable for use in the compositions of the invention are:

Compound F

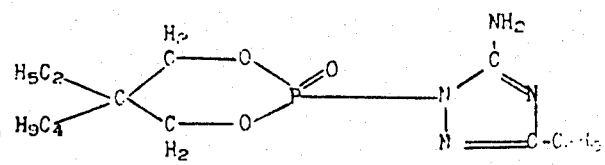

2-(5-amino-3-phenyl-1,2,4-triazol-1-yl)-5-ethyl-5-butyl-2-oxo-1,3,2-dioxaphosphorinane Compound G

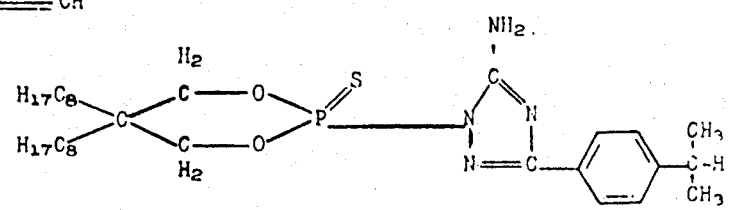

2-[5-amino-3-(4-isopropylphenyl)-1,2,4-triazol-1-yl]-5,5-dioctyl-2-thiono-1,3,2-dioxaphosphorinane Compound H

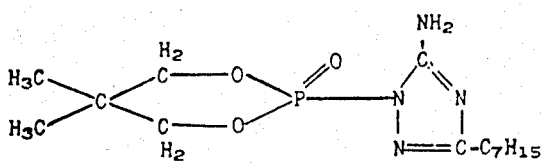

2-(5-amino-3-heptyl-1,2,4-triazol-1-yl)-5,5-dimethyl-2-oxo-1,3,2-dioxaphosphorinane Compound I

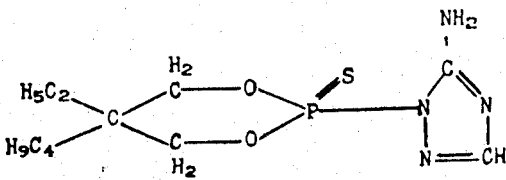

2-(5-amino-1,2,4-triazol-1-yl)-5-ethyl-5-butyl-2-thiono-1,3,2-dioxaphosphorinane

EXAMPLE II

In order to demonstrate the effectiveness of the compounds of the invention in imparting improved load-carrying ability to lubricant oils, various compositions were prepared and subjected to a Ryder Gear Test. This test was developed by Pratt and Witney in 1941 to evaluate lubricants at high speeds by observing the scuff on a pair of aircraft-quality gears to which a load is applied while the machine is in motion. Results are reported in terms of pounds per inch of tooth width. A complete description of this test is given in ASTM Bulletin No. 184, p. 41, September 1952. Test results are shown in Table 1.

Table I

| Ryder Gear Test | |
|---|---|
| Composition | Average Rating (lbs./in.) |
| Oil X* | 2500 |
| Composition 1 (Oil X plus 0.2%w Compound A) | 3265 |
| Composition 2 (Oil X plus 0.2%w Compound B) | 3260 |
| Oil Y* | 1700 |
| Composition 3 (Oil Y plus 0.2%w Compound A) | 2815 |
| Composition 4 (Oil X plus 0.2%w Compound D) | 3070 |

*Oil X - Esters of mono- and dipentaerythritol plus 2.0%w p,p'-di-t-octyldiphenylamine, and 1.0%w phenyl-alpha-naphthylamine.
*Oil Y - Diisooctyl and diisodecyl adipates, plus 2%w p,p'-di-t-octyl-diphenylamine, 0.5%w N-benzyl-3,7-dioctylphenothiazine, 1.0%w vinyl-pyrrolidone-methacrylate copolymer, and 0.1%w quinizarin.

EXAMPLE III

In order to determine the antioxidation and anticorrosion properties of the compositions of Example II, a series of corrosion and oxidation stability tests were run in accordance with military specification MIL-L-23699A. Results of these tests are presented in Tables II and III.

Table II

| | Corrosion and Oxidation Stability, 400°F, 72 Hours | | | |
|---|---|---|---|---|
| | MIL-L-23699A Specification Limits | Oil X | Corrosion, mg/cm² Composition 1 | Composition 2 |
| Magnesium | ±0.2 max | −2.53 | +0.03 | +0.01 |
| Copper | ±0.4 max | −1.89 | −0.09 | −0.12 |
| Iron | ±0.2 max | 0.01 | −0.01 | −0.01 |
| Aluminum | ±0.2 max | −0.01 | −0.01 | 0.00 |
| Silver | ±0.2 max | −0.05 | −0.02 | −0.09 |

Table III

| | Corrosion and Oxidation Stability, 425°F 48 hours Corrosion, mg/cm² | | Corrosion and Oxidation Stability, 347°F 72 hours Corrosion, mg/cm² MIL-L- | |
|---|---|---|---|---|
| | Composition 1 | Composition 2 | 23699A Specification Limits | Composition 3 |
| Magnesium | −0.02 | −0.02 | ±0.2 max | +0.01 |
| Copper | −0.17 | −0.21 | ±0.4 max | −0.02 |
| Iron | −0.02 | −0.01 | ±0.2 max | −0.01 |
| Aluminum | 0.00 | +0.01 | ±0.2 max | 0.00 |
| Silver | −0.02 | −0.05 | ±0.2 max | −0.05 |

EXAMPLE IV

A further indication of the stability of the compositions of the invention was obtained by subjecting samples of Compositions 1 and 2 to the Alcor High Temperature Deposition Test. Basically this test involves circulation of aerated oil over a heated deposition tube. The temperature of the tube is controlled at 525°F on the inlet side and reaches 650° to 700°F at the outlet end of the tube. The temperation profile of the tube is measured at the start shortly before the end of the test. These temperature profiles and the tube deposits per unit length are used to determine the performance of the oil. The critical temperature is that temperature at which deposits begin to significantly affect the heat transfer characteristics of the oil. A temperature of above 600°F is considered to be very satisfactory. The overall deposit rating is obtained from a combination of the visual deposit rating of the tube, the tube deposit weight and the filter deposit weight. An overall rating of less than 50 is considered very good, a rating of below 15 is considered exceptional. A detailed description of this test is given in "Proceedings of the USAF-Southwest Research Institute Turbine Lubrication Conference," Sept. 13-15, 1966, Southwest Research Institute, San Antonio, Texas, pg. 152. Test results are shown in Table IV.

Table IV

| Alcor High Temperature Deposition Test | | |
|---|---|---|
| | Composition 1 | Composition 2 |
| Critical temperature, °F | 650 | 640 |
| Tube deposits, mg | 4.8 | 14.6 |
| Overall rating | 8.5 | 12.5 |

EXAMPLE V

To further illustrate the load-carrying or extreme pressure (EP) capabilities of the additives of the invention the following compositions identified as Compositions 5 through 8 were formulated as in Table V and subjected to the Shell Four-Ball Wear Test. Test results are shown in Table VI.

Table V

| | Composition, %w | | | |
|---|---|---|---|---|
| Component | 5 | 6 | 7 | 8 |
| Oil Z HVI 100N (Viscosity approximately 100 SSU at 100°F) | 90%w | 90%w | 88%w | 88%w |
| (Acryloid 983) | 9%w | 9%w | 4%w | 4%w |
| 4,4'-methylene-bis(2,6-di-t-butyl phenol) | 1%w | 1%w | 1%w | 1%w |
| Polymeric VI improver | — | — | 7%w | 7%w |
| Additive | — | 1%w of Compound D | — | 0.2%w of Compound E |

Table VI

| Four-Ball Wear Test | |
|---|---|
| Composition | Scar Diameter, mm |
| 5 | 0.780 |
| 6* | 0.391 |
| 7 | 0.780 |
| 8* | 0.387 |

Table VI – Continued

| Composition | Four-Ball Wear Test[a] Scar Diameter, mm |
|---|---|

Variables
Speed 600 rpm
Temperature 200°F
Time 2 hours
Balls ¼"diameter steel

[a] 40 Kg load
[b] According to the invention

The Shell Four-Ball Wear Test is widely accepted as a repeatable screening test for lubricants having EP properties. Scar diameters less than 0.42 mm indicate that a lubricant has satisfactory EP characteristics and will probably perform adequately. Thus the performance of the compositions according to the invention demonstrate that such compositions possess EP properties to a high degree.

EXAMPLE VI

To particularly test the corrosivity of the inventive compositions with respect to lead, a lead corrosion test (described below) was conducted. Test results are as shown in Table VII.

The lead Corrosion (LC) Test consists of the addition of cleaned and weighed lead coils to a sample of oil, which is then placed in the Micro Air Oxidation Test (MAOT) apparatus at 325°F. The MAOT is ordinarily used to measure the oxidation stability of oils. A vessel containing 20g of sample is placed in a constant temperature bath. The vessel is fitted with a condenser and a fritted bubbler tube. Clean dry air is bubbled through the oil at a constant flow rate of 30 ml/min. After passage through the oil sample, the air steam is directed through a Beckman oxygen analyzer. This device senses the amount of oxygen present in the air stream, thereby providing a measure of the oxygen absorbed by the oil sample. The use of the MAOT apparatus makes it possible to examine simultaneously the oxidation stability and corrosivity of the oil. After five hours, the wire coils are removed, washed with benzene and methanol, wiped free of deposits and weighed. The data appear to be reproducible within ±2 mg.

Table VII

| Lead Corrosion Test | |
|---|---|
| Composition | Weight Loss mg |
| Composition 5[a] | −5.8 |
| Composition 6[b] | −2.6 |

[a] See Table V
[b] According to the invention

The results clearly demonstrate the resistance of the instant compositions to lead corrosion.

The foregoing test results clearly establish that phosphorinanetriazole derivatives are extremely suitable lubricating oil additives. The data presented in Table I and Table VI indicate that the addition of small amounts of the phosphorus containing triazoles improves the load-carrying capacity of the base oil by over 760 lbs/in in Compositions 1 and 2, 1115 lbs/in in Composition 3 and 570 lbs/in in Composition 4. In addition these additives are also excellent corrosion inhibitors and antioxidants as evidenced by the test results presented in Tables II, III and VII. Compositions 1 and 2 are shown to easily meet the very restrictive corrosion requirements of military specification MIL-L-23699A. The exceptional performance of these compositions in the Alcor High Temperature Deposition Test as shown in Table IV, is indicative of their inherent stability in a severe environment. Additionally, the performance of Compositions 6 and 8 in the Four Ball Test and Composition 6 in the LC Test demonstrates the load-carrying and anti-corrosion characteristics of these compositions in mineral oils.

The phosphorinane-triazole containing compositions of the invention therefore represent a class of lubricants which not only possess an excellent load-carrying capacity, but also have excellent anti-corrosion and oxidation properties and good high temperature stability.

Other disclosed compositions give equivalent, although not identical, results.

I claim as my invention:

1. A compound having the formula

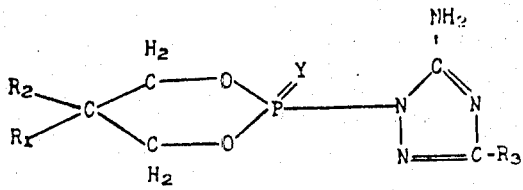

wherein $R_1$ and $R_2$ are each selected from the group consisting of hydrogen and $C_{1-20}$ alkyl groups, $R_3$ is selected from the group consisting of hydrogen, alkyl, aryl and alkaryl, said alkyl, aryl and alkaryl groups having from 1 to 12 carbon atoms, and Y is selected from the group consisting of oxygen and sulfur.

2. The compound of claim 1 wherein $R_1$ and $R_2$ are $C_{1-8}$ alkyl groups.

3. The compound of claim 2 wherein $R_3$ is hydrogen and $R_1$ and $R_2$ are $C_{1-4}$ alkyl groups.

4. The compound of claim 3 wherein $R_1$ and $R_2$ are methyl groups.

5. The compound of claim 4 wherein Y is oxygen.

6. The compound of claim 4 wherein Y is sulfur.

* * * * *